US007835362B2

(12) United States Patent
Libby et al.

(10) Patent No.: US 7,835,362 B2
(45) Date of Patent: Nov. 16, 2010

(54) METHODS AND SYSTEMS FOR THE MANAGEMENT OF SEQUENCE-SENSITIVE, CONNECTION-ORIENTED TRAFFIC ON A MULTI-LINK AGGREGATED PORT

(75) Inventors: Mark Gordon Libby, Groton, MA (US); Ronald Mark Parker, Boxborough, MA (US); Fouad Hallal, Worcester, MA (US)

(73) Assignee: Ciena Corporation, Linthicum, MD (US)

( * ) Notice: Subject to any disclaimer, the term of this patent is extended or adjusted under 35 U.S.C. 154(b) by 607 days.

(21) Appl. No.: 11/366,239

(22) Filed: Mar. 2, 2006

(65) Prior Publication Data
US 2007/0206562 A1 Sep. 6, 2007

(51) Int. Cl.
*H04L 12/56* (2006.01)
(52) U.S. Cl. ...................................... 370/394
(58) Field of Classification Search ......... 370/351–356, 370/389, 391, 394, 397, 395.43, 395.5, 395.51; 709/239–241
See application file for complete search history.

(56) References Cited

U.S. PATENT DOCUMENTS

| | | | | |
|---|---|---|---|---|
| 7,414,985 B1* | 8/2008 | Tedijanto et al. | ............ | 370/255 |
| 7,505,399 B2* | 3/2009 | McGee et al. | ............... | 370/216 |
| 7,529,180 B1* | 5/2009 | Karl et al. | ................... | 370/216 |
| 2002/0131437 A1* | 9/2002 | Tagore-Brage | ............... | 370/419 |
| 2004/0267959 A1* | 12/2004 | Cochran et al. | ............. | 709/239 |
| 2005/0160171 A1* | 7/2005 | Rabie et al. | ................. | 709/227 |
| 2005/0270980 A1* | 12/2005 | McGee | ....................... | 370/238 |
| 2006/0029097 A1* | 2/2006 | McGee et al. | ............... | 370/468 |
| 2006/0251074 A1* | 11/2006 | Solomon | ..................... | 370/392 |
| 2006/0251106 A1* | 11/2006 | Nakagawa et al. | .......... | 370/456 |
| 2007/0189313 A1* | 8/2007 | Bartley et al. | ............... | 370/406 |

* cited by examiner

*Primary Examiner*—Chirag G Shah
*Assistant Examiner*—Amarnauth Persaud
(74) *Attorney, Agent, or Firm*—Clements Bernard PLLC; Christopher L. Bernard; Tyler S. Brown

(57) ABSTRACT

The present invention provides methods and systems for the management of sequence-sensitive, connection-oriented traffic on a multi-link aggregated port. The methods include: at a first end of a multi-link aggregated port, selectively enabling a first constituent link of a plurality of constituent links to transmit data traffic in a first direction via a transmit state block associated with the first constituent link; and, at the first end of the multi-link aggregated port, selectively enabling the plurality of constituent links to receive data traffic from a second direction via a plurality of receive state blocks associated with the plurality of constituent links. The methods also include: at a second end of the multi-link aggregated port, selectively enabling a second constituent link of the plurality of constituent links to transmit data traffic in the second direction via a transmit state block associated with the second constituent link; and, at the second end of the multi-link aggregated port, selectively enabling the plurality of constituent links to receive data traffic from the first direction via a plurality of receive state blocks associated with the plurality of constituent links.

15 Claims, 5 Drawing Sheets

METHODS AND SYSTEMS FOR THE MANAGEMENT OF SEQUENCE-SENSITIVE, CONNECTION-ORIENTED TRAFFIC ON A MULTI-LINK AGGREGATED PORT

FIELD OF THE INVENTION

The present invention relates generally to the telecommunications and networking fields. More specifically, the present invention relates to methods and systems for the management of sequence-sensitive, connection-oriented traffic on a multi-link aggregated port, such as an Institute of Electrical and Electronics Engineers (IEEE) 802.3ad Link Aggregation Group (LAG) or the like.

BACKGROUND OF THE INVENTION

Link aggregation is a data networking term that refers to using a plurality of Ethernet network cables/ports in parallel in order to increase link speed beyond the capability of any single cable/port. Alternative terms for link aggregation include Ethernet trunking, Network Interface Card (NIC) teaming, port trunking, port teaming, and NIC bonding. LAGs are based on the IEEE 802.3ad standard. The various IEEE 802.3 standards are incorporated by reference herein.

LAGs provide a relatively inexpensive mechanism by which a high-speed backbone network is set up, the network transferring more data than a single port or device is capable of utilizing. This allows a plurality of devices to communicate simultaneously at their full single-port speed, while prohibiting any single device from monopolizing all available backbone capacity. Additionally, LAGs allow the backbone network to incrementally grow as network demand increases, without having to replace equipment.

LAGs allow for the grouping of a plurality of logical or physical links into a single logical link, thereby providing improved bandwidth flexibility and resource allocation. The IEEE 802.3ad standard allows for the aggregation of multiple Ethernet ports, such as 1 Gbps or 10 Gbps Ethernet ports, up to a maximum aggregated 80 Gbps bandwidth. For example, a plurality of GigE interfaces may be bundled together to present a single logical interface that controls the resources of all of the constituent links (e.g. two GigE interfaces may be bundled together to present a single 2 Gbps logical interface that controls the resources of the two GigE interfaces). Fiber optic backbones typically operate at 10 Gbps line rates. 10 GigE networking interfaces exist, the they are relatively expensive and are typically used for specialized tasks. LAGs are useful for grouping single GigE networking interfaces for transmission on a 10 Gbps backbone.

Typically, LAGs have been used in connectionless, best-effort environments in which there is no standard relationship between one packet or frame and the next packet or frame (e.g. there is no ordering relationship between one packet or frame and the next packet or frame), nor is there any need to reserve resources for said data. For example, in standard Ethernet environments, there is no data ordering guarantee from one frame to the next frame, nor is there any data delivery guarantee. It is assumed that higher layers have the ability to handle both the reordering of data into an ordered stream and packet or frame loss. This is not an issue in a traditional data network as there is no frame ordering requirement. For example, a computer operating a browser that is capable of viewing hyper-text markup language (HTML) documents reassembles frames in the correct order. A user may experience a delay associated with this process, but it is not critical as this is viewed as a best-effort environment.

In general, attempts are made to preserve data ordering via sub-flow identification. Data associated with a given sub-flow is transmitted across the same constituent link in order to guarantee data ordering. Data is received in order because it is transmitted on the same constituent link and each frame is received in the order it was transmitted. However, there is no standard mechanism for identifying sub-flows, with sub-flow identification left to individual implementations.

IEEE 802.3ad defines a Marker protocol to guarantee data ordering. This Marker protocol involves a sending side notifying a receiving side that it is about to move a sub-flow from one link to another. However, it does not specify flow identification or resource reservation for a given flow. Resource reservation allows physical resources to be reserved in order to provide connection-oriented functions, such as rate enforcement and quality of service guarantees.

With the advent of sequence-sensitive, connection-oriented traffic, such as Pseudowire Emulation Edge-to-Edge (PWE3) traffic, and its delivery across LAGs, data ordering and delivery guarantees become much more important, as these are properties of layer 2 connection-oriented services. PWE3 is an emulation over Ethernet of native services, such as Asynchronous Transfer Mode (ATM), Frame Relay (FR), Time Division Multiplexed (TDM), and Synchronous Optical Network/Synchronous Digital Hierarchy (SONET/SDH) services. Due to the characteristics of these services, out-of-order packets or frames are not tolerated by higher layers and call admission control during call setup is used to reserve resources in order to guarantee quality of service parameters.

Thus, what is needed is an improved mechanism by which sequence-sensitive, connection-oriented data is allocated resources, delivered, and received across LAGs.

BRIEF SUMMARY OF THE INVENTION

The present invention provides an improved mechanism for allocating resources and preserving the sequence of connection-oriented traffic traversing a LAG. The present invention describes the behavior of one end of the LAG and is designed to work regardless of the behavior of the other end of the LAG. In other words, the present invention provides an improved mechanism for supporting sequence-sensitive, connection-oriented data across an aggregated link bundle which preserves properties of the data that are expected by an end user. By using a reduced number of state blocks, hardware resources are more efficiently used. The improved mechanism of the present invention is applicable to markets in which layer 2 technologies are being migrated to connectionless environments. For example, ATM and FR sequence-sensitive, connection-oriented circuits are being migrated to Internet Protocol/Multi-Protocol Label Switching (IP/MPLS) backbone networks.

In one exemplary embodiment of the present invention, a method for the management of sequence-sensitive, connection-oriented traffic on a multi-link aggregated port includes: at a first end of a multi-link aggregated port, selectively enabling a first constituent link of a plurality of constituent links to transmit data traffic in a first direction across the first constituent link via a transmit state block associated with the first constituent link; and, at the first end of the multi-link aggregated port, selectively enabling the plurality of constituent links to receive data traffic from a second direction across the plurality of constituent links via a plurality of receive state blocks associated with the plurality of constituent links. The method also includes: at a second end of the multi-link aggregated port, selectively enabling a second constituent link of the plurality of constituent links to transmit data traffic in the second direction across the second constituent link via a transmit state block associated with the second constituent link; and, at the second end of the multi-link aggregated port, selectively enabling the plurality of constituent links to receive data traffic from the first direction across the plurality of constituent links via a plurality of receive state blocks associated with the plurality of constituent links.

In another exemplary embodiment of the present invention, a system for the management of sequence-sensitive, connection-oriented traffic on a multi-link aggregated port includes: a multi-link aggregated port having a first end and a second end and including a plurality of constituent links; a transmit state block disposed at the first end of the multi-link aggregated port and associated with a first constituent link of the plurality of constituent links, the transmit state block associated with the first constituent link enabling the first constituent link to transmit data traffic in a first direction across the first constituent link; and a plurality of receive state blocks disposed at the first end of the multi-link aggregated port and associated with the plurality of constituent links, the plurality of receive state blocks associated with the plurality of constituent links enabling the plurality of constituent links to receive data traffic from a second direction across the plurality of constituent links. The system also includes: a transmit state block disposed at the second end of the multi-link aggregated port and associated with a second constituent link of the plurality of constituent links, the transmit state block associated with the second constituent link enabling the second constituent link to transmit data traffic in the second direction across the second constituent link; and a plurality of receive state blocks disposed at the second end of the multi-link aggregated port and associated with the plurality of constituent links, the plurality of receive state blocks associated with the plurality of constituent links enabling the plurality of constituent links to receive data traffic from the first direction across the plurality of constituent links.

In a further exemplary embodiment of the present invention, a method for the management of sequence-sensitive, connection-oriented traffic on a multi-link aggregated port includes: selecting a first constituent link of a plurality of constituent links to transmit data traffic in a first direction; selecting a second constituent link of the plurality of constituent links to transmit data traffic in a second direction; at a first end of a multi-link aggregated port, selectively enabling the first constituent link of the plurality of constituent links to transmit data traffic in the first direction across the first constituent link via a transmit state block associated with the first constituent link; at the first end of the multi-link aggregated port, selectively enabling the plurality of constituent links to receive data traffic from the second direction across the plurality of constituent links via a plurality of receive state blocks associated with the plurality of constituent links; at a second end of the multi-link aggregated port, selectively enabling the second constituent link of the plurality of constituent links to transmit data traffic in the second direction across the second constituent link via a transmit state block associated with the second constituent link; and, at the second end of the multi-link aggregated port, selectively enabling the plurality of constituent links to receive data traffic from the first direction across the plurality of constituent links via a plurality of receive state blocks associated with the plurality of constituent links.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

As described above, in a typical LAG environment, any of the constituent links of the LAG are equally able to handle data that is to be transmitted across the LAG. This is acceptable for connectionless, best-effort environments in which there is no standard relationship between one packet or frame and the next packet or frame (e.g. there is no ordering relationship between one packet or frame and the next packet or frame), nor is there any need to reserve resources for said data.

Connection-oriented environments, however, use a call setup paradigm to stitch up a path from source to destination, as well as to reserve resources (such as bandwidth, queues, etc.) for a connection. Physical resources may need to be reserved in order to provide connection-oriented functions, such as rate enforcement and quality of service guarantees. In such environments, a connection defines a flow and either resources need to be allocated against all constituent links in order to provide bandwidth and quality of service guarantees or a single link must be chosen to handle the connection.

Figure 1:
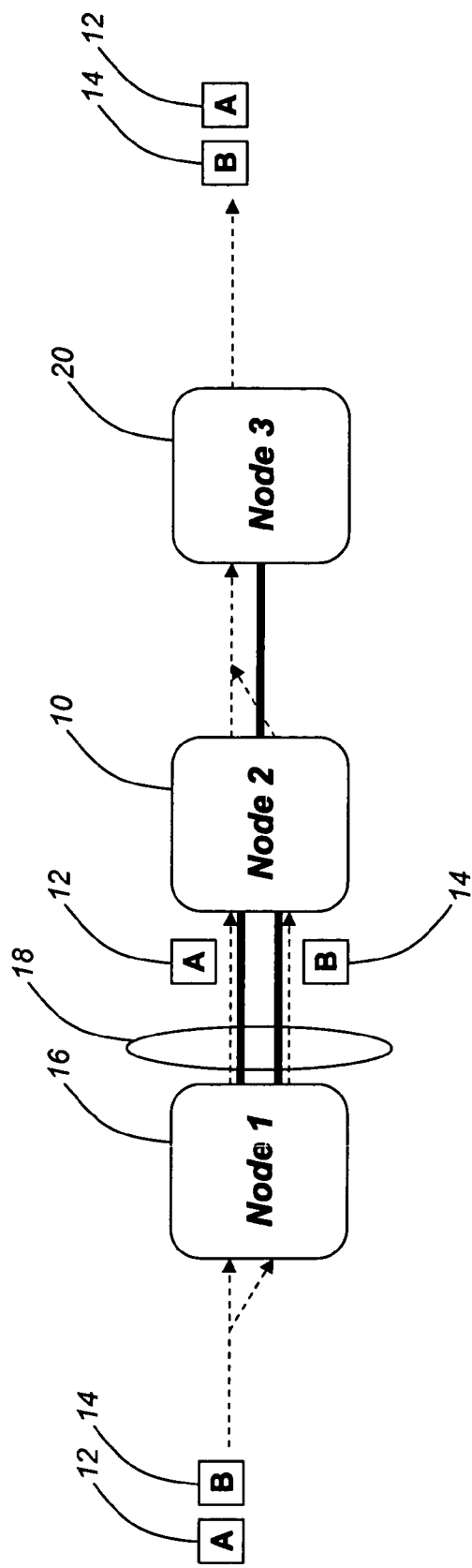
FIG. 1 is a schematic diagram illustrating how, using conventional methods and systems, data may be delivered out of order if data from the same flow follows different constituent links associated with a LAG.

Sequence-sensitive, connection-oriented environments add an additional requirement, as data order must be preserved as data is transmitted along a connection's path. For sequence-sensitive connections, the constituent links of a LAG are not equally able to handle data from the same connection, as all data for that connection must traverse the same constituent link in order to preserve data ordering. FIG. 1 illustrates how, using conventional methods and systems, data may be delivered out of order if data from the same flow follows different constituent links associated with a LAG. Referring to FIG. 1, node 2 10 receives frame A 12 and frame B 14 from node 1 16 and the LAG 18, however, node 2 10 has no way of knowing that frame B 14 should be received, and subsequently delivered to node 3 20, before frame A 12. Node 2 10 simply transmits frame A 12 and frame B 14 as they arrive. Due to scheduling, congestion, other delay, etc., frame A 12 may be processed before frame B 14, resulting in the data stream arriving at the destination in a different order than it was transmitted from the source (i.e. frame A 12/frame B 14 at the destination, as opposed to frame B 14/frame A 12 from the source). Thus, in order to guarantee delivery order, the same constituent link must be used for the transmission of data for a given connection or flow.

A relatively simple solution to the resource problem is to allocate resources against all links. However, this results in sub-optimal resource utilization that defeats the purpose of the LAG in the first place (i.e. resources allocated against a link that is not currently being used to transmit data for a particular connection are wasted) and does not solve the data ordering problem. Another relatively simple solution is to handle call admission control, resource allocation, and rate enforcement functions centrally for the LAG. However, this does not scale well as links are added to and removed from the LAG.

Figure 2:
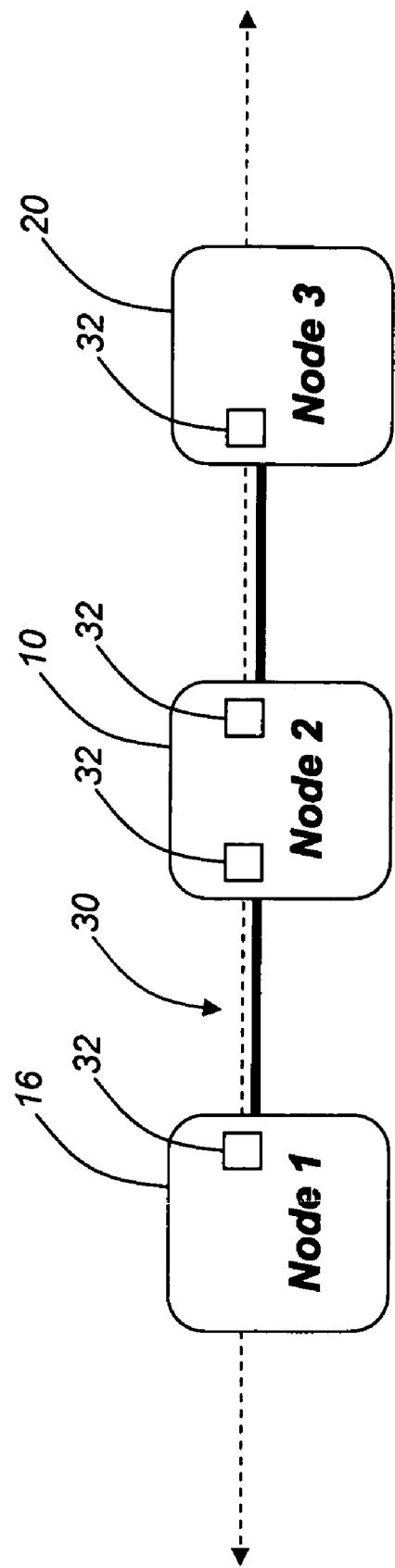
FIG. 2 is a schematic diagram illustrating how, using conventional methods and systems, state blocks are used by connection-oriented traffic traversing a previously established path.

By its nature, connection-oriented traffic traverses a previously established path from source to destination. FIG. 2 illustrates how, using conventional methods and systems, state blocks are used by connection-oriented traffic traversing a previously established path. Referring to FIG. 2, at each hop in the path along the bidirectional connection 30, a state block 32 is maintained for the duration of the connection. This state block 32 contains information about the connection, such as rate enforcement/policing state, hardware resource allocation (hardware buffers, bandwidth, etc.), cross-connect information, and manipulations (adding/removing PWE3 labels, etc.). When data arrives on a connection, the state block 32 is referenced to determine: a) whether to accept or drop the data (i.e. policing and hardware resource checking); b) where to forward the data (i.e. cross connect checking); and c) how to manipulate the data (i.e. header manipulating).

In a LAG environment, at each LAG interface, there are multiple independent links that may be used to transmit and receive data for a given connection. From a transmitting of sequence-sensitive traffic point of view, one constituent link must be selected and used for all data in order to preserve data sequence integrity. From a receiving point of view, all links must be considered equally able to present data from a given connection. This is due to the fact that there is no coordination between the two sides of the LAG link to agree on a given constituent link to use for a given connection.

The present invention provides an improved mechanism for allocating resources and preserving the sequence of connection-oriented traffic traversing a LAG. The present invention describes the behavior of one end of the LAG and is designed to work regardless of the behavior of the other end of the LAG.

Figure 3:
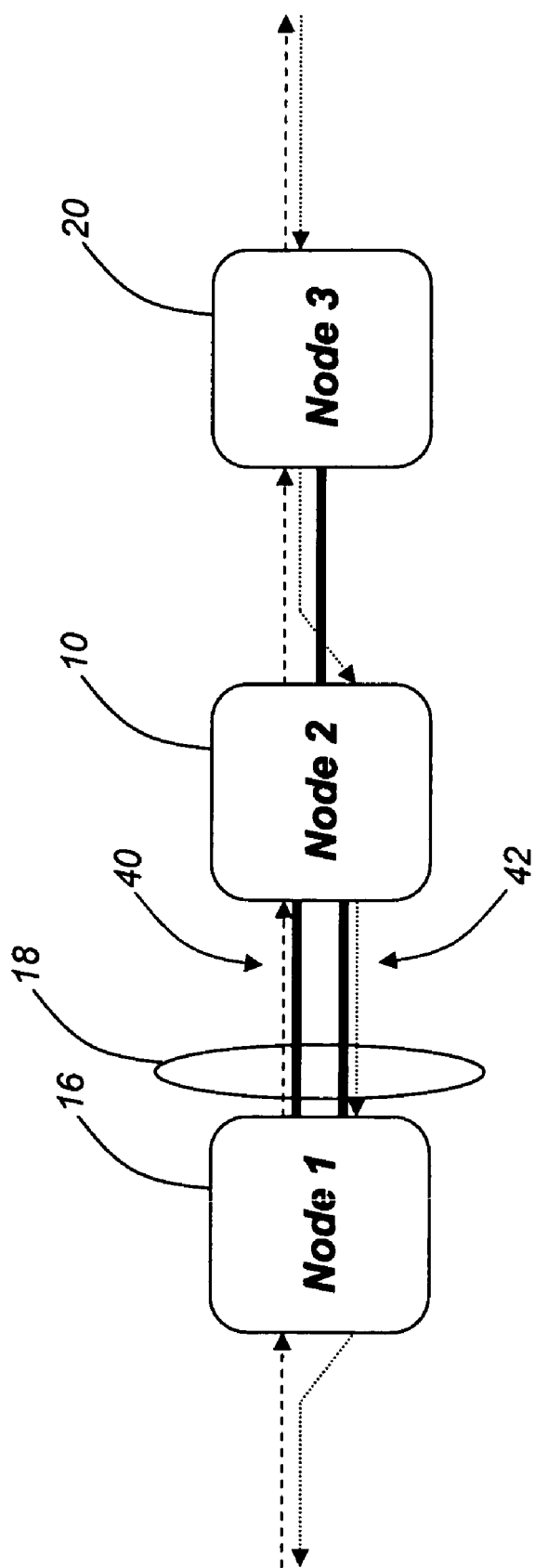
FIG. 3 is a schematic diagram illustrating a bidirectional connection represented as two unidirectional connections, in accordance with the methods and systems of the present invention.

Referring to FIG. 3, a bidirectional connection 30 (FIG. 2) may be broken into two unidirectional connections 40,42 and handled accordingly. During the connection setup of sequence-sensitive traffic over a LAG 18, one of the LAG's constituent links or paths 40 will be chosen to host a transmit state block 50 (FIG. 4) of the connection based upon predetermined criteria (bandwidth availability, etc.), while another of the LAG's constituent links or paths 42 will not be chosen to host the transmit state block 50 of the connection based upon the same predetermined criteria. Once the connection is completed, all data to be transmitted through the LAG 18 flows across the constituent link or path 40 chosen during the connection setup phase. In addition, every constituent link in the LAG 18 must be given enough state information to handle data received from the constituent link for the connection. This is called a receive state block 52 (FIG. 4), and it is created on every constituent link during the connection setup phase.

Figure 4:
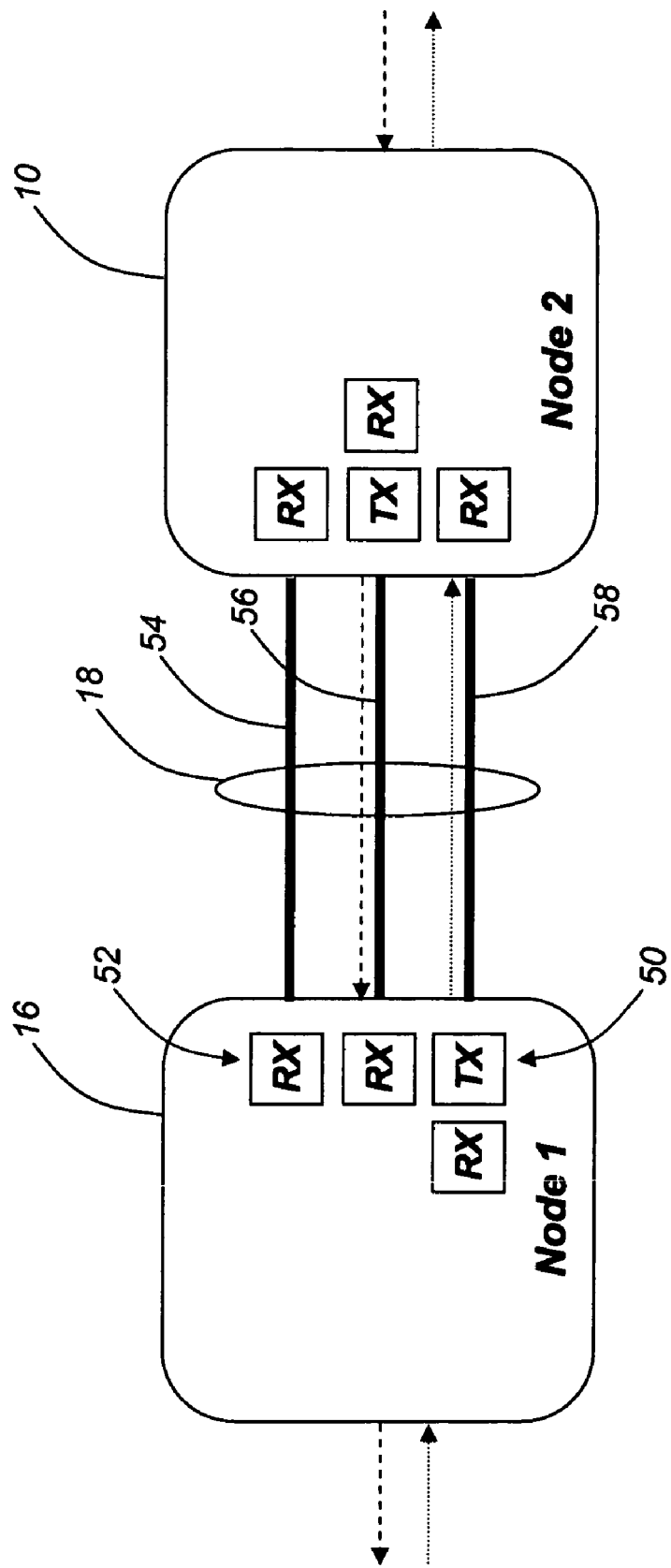
FIG. 4 is a schematic diagram illustrating one exemplary embodiment of a transmit state block/receive state block configuration, in accordance with the methods and systems of the present invention.

Referring to FIG. 4, in one exemplary embodiment of the present invention, a LAG 18 has three constituent links 54,56, 58. Data flowing from left to right always flows across the third constituent link 58 (where the transmit state block 50 resides in that direction). Data flowing from right to left always flows across the second constituent link 56 (where the transmit state block 50 resides in that direction). Both sides are able to receive data on any of the constituent links 54,56, 58 due to the presence of receive state blocks 52 on every constituent link 54,56,58. In general, resource allocation is greater on the transmit side than on the receive side. By reducing the number of transmit state blocks 50, resources are efficiently utilized. In this manner, one end of a LAG 18 will use one of the constituent links 56,58 for data transmission and all of the constituent links 54,56,58 for data reception, thus avoiding the need to coordinate with the other end of the LAG 18, while preserving data ordering.

Figure 5:
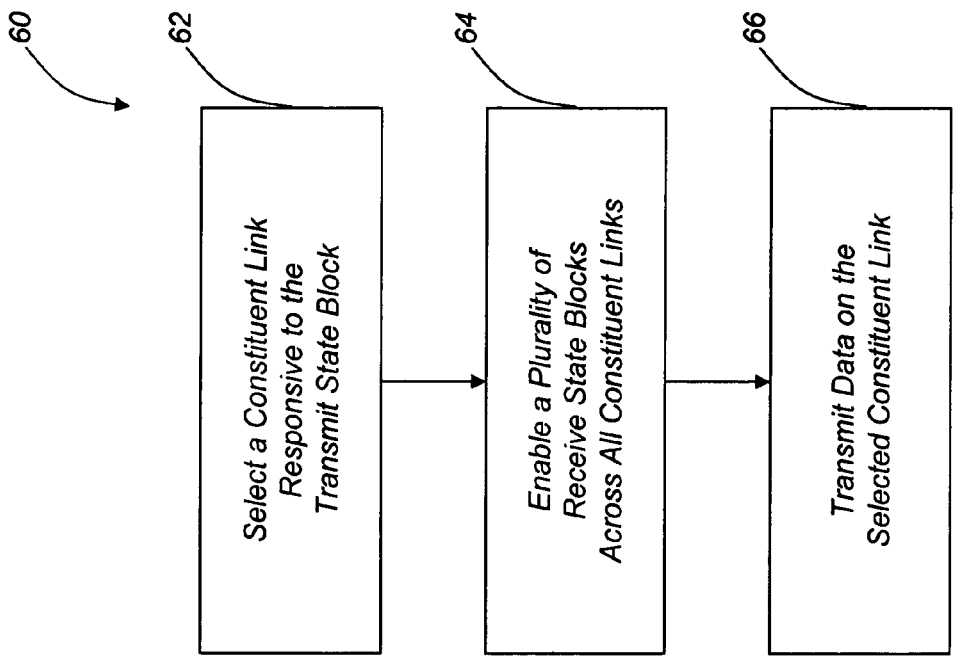
FIG. 5 is a flowchart illustrating one exemplary embodiment of a connection setup of the present invention.

FIG. 5 is a flowchart illustrating one exemplary embodiment of a connection setup 60 of the present invention. The connection setup 60 is used when sequence-sensitive traffic is transmitted over a LAG. The connection setup 60 begins by selecting a constituent link responsive to the transmit state block (Block 62). The transmit state block contains information about the connection, such as rate enforcement, policing state, hardware resource allocation (hardware buffers, bandwidth, etc.), cross-connect information, and manipulations (adding/removing PWE3 labels, etc.). The constituent link is selected based on predetermined conditions in the transmit state block. For example, a constituent link may be selected because it has more bandwidth available than other constituent links.

The connection setup 60 enables a plurality of receive state blocks across all constituent links (Block 64). Thus, the connection setup 60 is configured to receive across any constituent link. This allows the connection setup 60 to operate at one end, without coordinating at an opposite end, and while minimizing the number of transmit state blocks.

The connection setup 60 transmits data on the selected constituent link (Block 66). This constituent link is used throughout the transmission of the sequence-sensitive traffic. The connection setup 60 is performed at both sides or ends of the connection. The constituent link selected for transmission may be different at each side or end. This is implemented by enabling receive state blocks on all constituent links, as described above.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for the management of sequence-sensitive, connection-oriented traffic on a multi-link aggregated port, the method comprising:

at a first end of a multi-link aggregated port, selectively enabling only a first constituent link of a plurality of constituent links forming a logical Link Aggregation Group to transmit data traffic in a first direction across the first constituent link via a transmit state block associated with the first constituent link, wherein the first constituent link is enabled without coordinating with any other node;

at the first end of the multi-link aggregated port, selectively enabling all of the plurality of constituent links to receive data traffic from a second direction across the plurality of constituent links via a plurality of receive state blocks associated with the plurality of constituent links;

at the second end of the multi-link aggregated port, selectively enabling only a second constituent link of the plurality of constituent links to transmit data traffic in the second direction across the second constituent link via a transmit state block associated with the second constituent link, wherein the second constituent link is enabled without coordinating with the first end of the multi-link aggregated port;

at the second end of the multi-link aggregated port, selectively enabling all of the plurality of constituent links to receive data traffic from the first direction across the plurality of constituent links via a plurality of receive state blocks associated with the plurality of constituent links; and checking a receive state block responsive to receiving data traffic from the second direction across a constituent link in order to determine whether to accept the data traffic, where to forward the data traffic, and how to manipulate the data traffic;

wherein the transmit state blocks and receive state blocks comprise connection information, wherein the connection information comprises one or more of rate enforcement information, policing state information, hardware resource allocation information, bandwidth information, cross-connection information, and label manipulation information.

2. The method of claim 1, further comprising transmitting data traffic in the first direction across the first constituent link.

3. The method of claim 1, further comprising transmitting data traffic in the second direction across the second constituent link.

4. The method of claim 1, wherein the multi-link aggregated port comprises a Link Aggregation Group.

5. The method of claim 1, further comprising updating connection information on the first end and second end of the multi-link aggregated port.

6. A system for the management of sequence-sensitive, connection-oriented traffic on a multi-link aggregated port, the system comprising:

a multi-link aggregated port having a first end and a second end and comprising a plurality of constituent links forming a logical Link Aggregation Group;

a transmit state block disposed at the first end of the multi-link aggregated port and associated with a first constituent link of the plurality of constituent links, the transmit state block associated with the first constituent link enabling only the first constituent link to transmit data traffic in a first direction across the first constituent link, wherein the first constituent link is enabled without coordinating with any other node;

a plurality of receive state blocks disposed at the first end of the multi-link aggregated port and associated with the plurality of constituent links, the plurality of receive state blocks associated with the plurality of constituent links enabling all of the plurality of constituent links to receive data traffic from a second direction across the plurality of constituent links;

a transmit state block disposed at the second end of the multi-link aggregated port and associated with a second constituent link of the plurality of constituent links, the transmit state block associated with the second constituent link enabling only the second constituent link to transmit data traffic in the second direction across the second constituent link, wherein the second constituent link is enabled without coordinating with the first end of the multi-link aggregated port;

a plurality of receive state blocks disposed at the second end of the multi-link aggregated port and associated with the plurality of constituent links, the plurality of receive state blocks associated with the plurality of constituent links enabling all of the plurality of constituent links to receive data traffic from the first direction across the plurality of constituent links; and means for checking a receive state block responsive to receiving data traffic from the second direction across a constituent link in order to determine whether to accept the data traffic, where to forward the data traffic, and how to manipulate the data traffic;

wherein the transmit state blocks and receive state blocks comprise connection information, wherein the connection information comprises one or more of rate enforcement information, policing state information, hardware resource allocation information, bandwidth information, cross-connection information, and label manipulation information.

7. The system of claim 6, further comprising means for transmitting data traffic in the first direction across the first constituent link.

8. The system of claim 6, further comprising means for transmitting data traffic in the second direction across the second constituent link.

9. The system of claim 6, wherein the multi-link aggregated port comprises a Link Aggregation Group.

10. The system of claim 6, further comprising means for updating connection information on the first end and second end of the multi-link aggregated port.

11. A method for the management of sequence-sensitive, connection-oriented traffic on a multi-link aggregated port, the method comprising:

selecting a first constituent link of a plurality of constituent links forming a logical Link Aggregation Group to transmit data traffic in a first direction;

selecting a second constituent link of the plurality of constituent links to transmit data traffic in a second direction;

at a first end of a multi-link aggregated port, selectively enabling only the first constituent link of the plurality of constituent links to transmit data traffic in the first direction across the first constituent link via a transmit state block associated with the first constituent link, wherein the first constituent link is enabled without coordinating with any other node;

at the first end of the multi-link aggregated port, selectively enabling all of the plurality of constituent links to receive data traffic from the second direction across the plurality of constituent links via a plurality of receive state blocks associated with the plurality of constituent links;

at the second end of the multi-link aggregated port, selectively enabling only the second constituent link of the plurality of constituent links to transmit data traffic in the second direction across the second constituent link via a transmit state block associated with the second constituent link, wherein the second constituent link is enabled without coordinating with any other node;

at the second end of the multi-link aggregated port, selectively enabling all of the plurality of constituent links to receive data traffic from the first direction across the plurality of constituent links via a plurality of receive state blocks associated with the plurality of constituent links and checking a receive state block responsive to receiving data traffic from the second direction across a constituent link in order to determine whether to accept the data traffic, where to forward the data traffic, and how to manipulate the data traffic;

wherein the transmit state blocks and receive state blocks comprise connection information, wherein the connection information comprises one or more of rate enforcement information, policing state information, hardware resource allocation information, bandwidth information, cross-connection information, and label manipulation information.

12. The method of claim 11, further comprising transmitting data traffic in the first direction across the first constituent link.

13. The method of claim 11, further comprising transmitting data traffic in the second direction across the second constituent link.

14. The method of claim 11, wherein the multi-link aggregated port comprises a Link Aggregation Group.

15. The method of claim 11, further comprising updating connection information on the first end and second end of the multi-link aggregated port.

* * * * *